(12) United States Patent
Rogers

(10) Patent No.: US 12,443,553 B2
(45) Date of Patent: Oct. 14, 2025

(54) USB-C ORIENTATION DETECTION

(71) Applicant: Microchip Technology Incorporated, Chandler, AZ (US)

(72) Inventor: Andrew Rogers, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 55 days.

(21) Appl. No.: 18/108,806

(22) Filed: Feb. 13, 2023

(65) Prior Publication Data

US 2023/0273888 A1    Aug. 31, 2023

Related U.S. Application Data

(60) Provisional application No. 63/313,799, filed on Feb. 25, 2022.

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01)

(58) Field of Classification Search
CPC .............. G06F 13/382; G06F 13/4282; G06F 2213/0042
USPC ............... 710/2, 8, 16–19, 32, 62, 105, 305; 370/248
See application file for complete search history.

(56) References Cited

U.S. PATENT DOCUMENTS

| | | |
|---|---|---|
| 2018/0027330 A1 | 1/2018 | Rand et al. |
| 2018/0060270 A1* | 3/2018 | Schnell ............... G06F 13/4022 |
| 2018/0275732 A1* | 9/2018 | Chen ....................... G06F 1/263 |
| 2019/0042503 A1* | 2/2019 | Montero ............. G06F 13/4282 |
| 2019/0236037 A1* | 8/2019 | Sugumar ................. G06F 1/266 |
| 2020/0287334 A1* | 9/2020 | Kulkarni ................ H01R 13/64 |
| 2022/0012202 A1* | 1/2022 | Regupathy .......... G06F 13/4059 |

OTHER PUBLICATIONS

Delshadpour, Siamak et al. "BMC Analog and Digital PHY for USB Type-C Power Delivery," Canadian Journal of Electrical and Computer Engineering, vol. 43, No. 3, Summer 2020, pp. 195-202. (Year: 2020).*
"Universal Serial Bus Type-C Cable and Connector Specification, Release 1.3," USB 3.0 Promoter Group, URL: http://www.usb.org/developers/docs, 241 pages.
International Search Report and Written Opinion, Application No. PCT/US2023/013786, 10 pages.

* cited by examiner

*Primary Examiner* — Tim T Vo
*Assistant Examiner* — Henry W Yu
(74) *Attorney, Agent, or Firm* — SLAYDEN GRUBERT BEARD PLLC

(57) ABSTRACT

An apparatus includes two PHY circuits, each including a PHY transmitter circuit and connected to a universal serial bus (USB)-C connector. The apparatus includes a USB circuit to issue a receiver detect signal through one of the PHY transmitters circuit to the USB-C connector, issue another receiver detect signal through the other PHY transmitter circuit to the USB-C connector, determine which receiver detect signal resulted in a termination in a USB-C element, and consequently determine an orientation of a USB plug connected between the apparatus and the USB-C element.

18 Claims, 8 Drawing Sheets

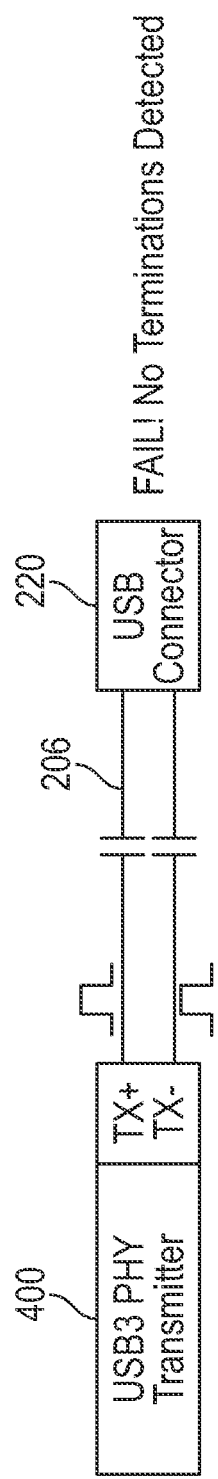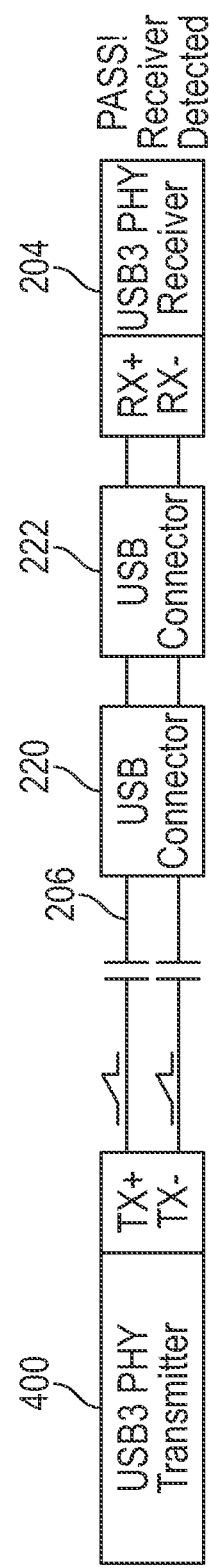

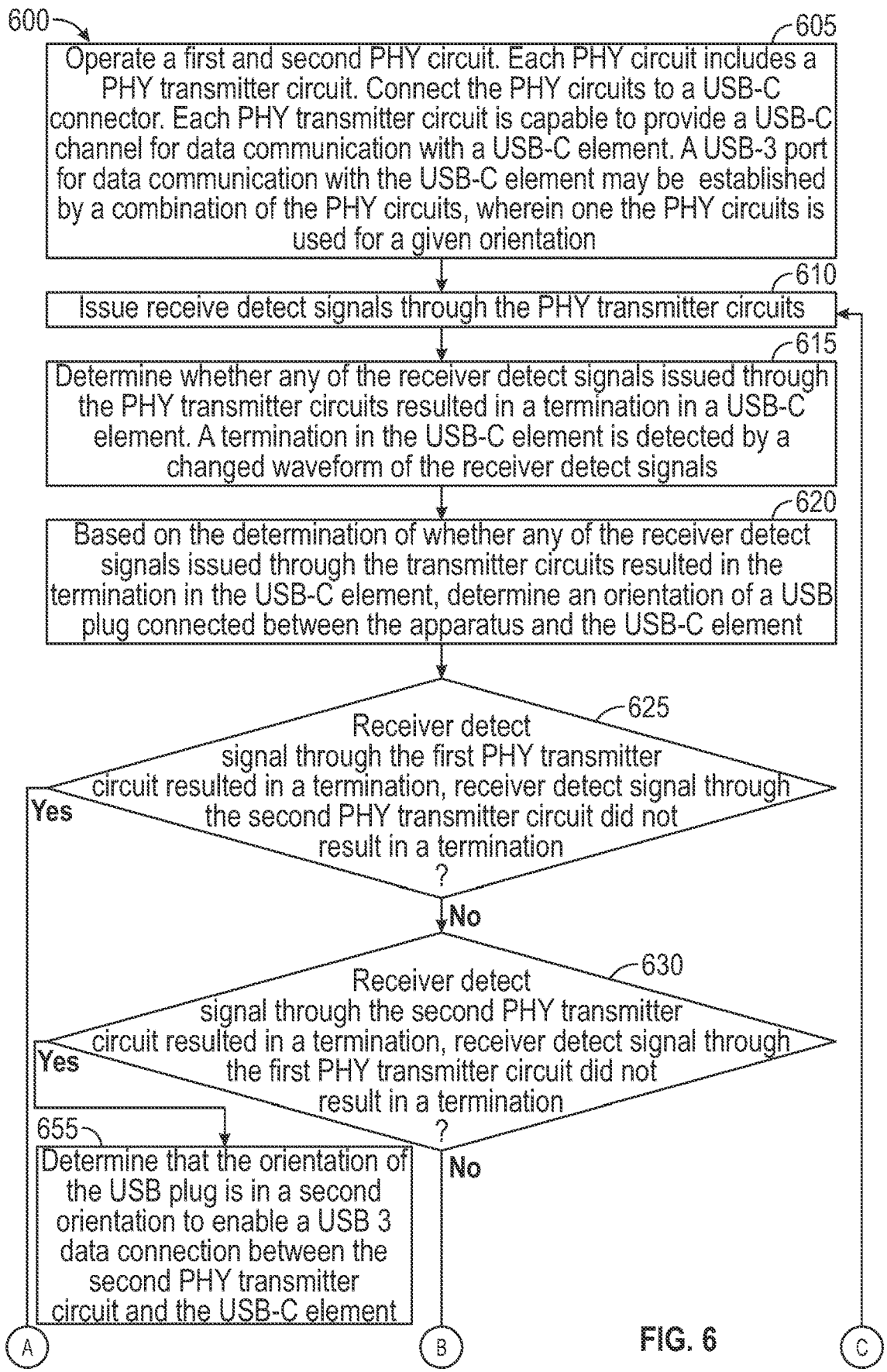

USB-C ORIENTATION DETECTION

PRIORITY

The present application claims priority to U.S. Provisional Patent Application No. 63/313,799 filed Feb. 25, 2022, the contents of which are hereby incorporated in their entirety.

FIELD OF THE INVENTION

The present application relates to universal serial bus (USB) connections between electronic devices and, more particularly, to an automatic USB-C (also known as USB Type-C) orientation detection from a USB 3 port.

BACKGROUND

USB-C is a 24-pin USB connector system with a rotationally symmetrical connector. That is, connectors may be reversible. In particular, male USB-C connectors or plugs may have two orientations in which the USB-C connector may be inserted into a female USB-C connectors or receptacles. Plugs may often be found on USB-C cables while receptacles may often be found on USB elements such as hosts, hubs, or devices, or adapters. USB-C plugs may be inserted into USB-C receptacles in one of two orientations, wherein each orientation is 180° apart. USB communications may be successfully established when plugs are used in either orientation.

USB-C connectors may have 24 pins, as described in the table below. The order of the pins in the "A" column may be placed along one edge of the USB-C connector, each corresponding to the order of the pins in the "B" column, which in turn may be placed along an opposite, corresponding edge of the USB-C connector.

TABLE 1

USB-C Pinout

| "A" Pin | Name | Description | Pin | Name | Description |
|---|---|---|---|---|---|
| A1 | GND | Ground return | B12 | GND | Ground return |
| A2 | SSTXp1 ("TX1+") | SuperSpeed differential pair #1, TX, positive | B11 | SSRXp1 ("RX2+") | SuperSpeed differential pair #2, RX, positive |
| A3 | SSTXn1 ("TX1-") | SuperSpeed differential pair #1, TX, negative | B10 | SSRXn1 ("RX2-") | SuperSpeed differential pair #2, RX, negative |
| A4 | VBUS | Bus power | B9 | VBUS | Bus power |
| A5 | CC1 | Configuration channel | B8 | SBU2 | Sideband use (SBU) |
| A6 | Dp1 | USB 2.0 differential pair, position 1, positive | B7 | Dn2 | USB 2.0 differential pair, position 2, negative |
| A7 | Dn1 | USB 2.0 differential pair, position 1, negative | B6 | Dp2 | USB 2.0 differential pair, position 2, positive |
| A8 | SBU1 | Sideband use (SBU) | B5 | CC2 | Configuration channel |
| A9 | VBUS | Bus power | B4 | VBUS | Bus power |
| A10 | SSRXn2 ("RX2-") | SuperSpeed differential pair #4, RX, negative | B3 | SSTXn2 ("TX-") | SuperSpeed differential pair #3, TX, negative |
| A11 | SSRXp2 ("RX2+") | SuperSpeed differential pair #4, RX, positive | B2 | SSTXp2 ("TX+") | SuperSpeed differential pair #3, TX, positive |
| A12 | GND | Ground return | B1 | GND | Ground return |

As discussed above, a USB-C plug may be plugged into a USB-C receptacle in one of two opposite orientations. The two orientations may be referred to as, for example, up/down, or flipped/unflipped. To detect the particular orientation when a USB-C plug is plugged into a USB-C receptacle, the USB Specification states that the configuration channel (CC) pins (A5, B5) are monitored to see if a pull-up or pull-down resistor is applied to such a pin, which may indicate a connection at the other end of the cable. This is often performed by power delivery (PD) circuits that are configured to determine what power will be transferred between the connected elements.

However, inventors of examples of the present disclosure have discovered that various implementations of PD circuits, such as PD controllers, may yield a variety of mechanisms by which a given PD circuit may inform other parts of a USB element of the orientation of a USB-C plug. Moreover, the communication of this information between the PD circuit and other portions of the USB element may require additional wiring. Examples of the present disclosure address one or more of these issues.

BRIEF DESCRIPTION OF THE DRAWINGS

FIGS. 4A and 4B are illustrations of a USB 3 PHY transmitter circuit to detect a connection to a USB 3 PHY receiver circuit 402, according to examples of the present disclosure.

DETAILED DESCRIPTION

Figure 1:
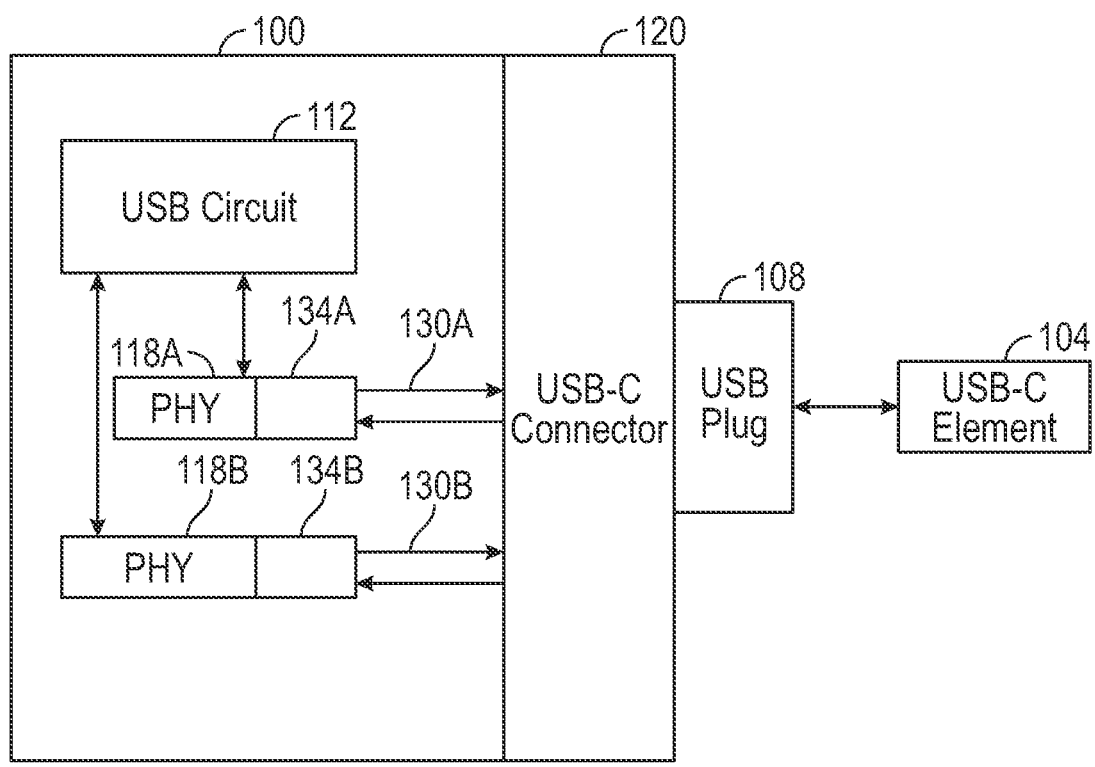
FIG. 1 is an illustration of an example apparatus with automatic USB-C orientation detection from a USB 3 port, according to examples of the present disclosure.

FIG. 1 is an illustration of an example apparatus 100 with automatic USB-C orientation detection from a USB 3 port, according to examples of the present disclosure. Apparatus 100 may include a first PHY circuit 118A including a first PHY transmitter circuit 134A. First PHY circuit 118A may be configured to connect to a USB-C connector 120. Apparatus 100 may include a second PHY circuit 118B including a second PHY transmitter circuit 134B. Second PHY circuit 118B may be configured to connect to USB-C connector 120. Apparatus 100 may include a USB circuit 112. USB circuit 112 may be configured to issue receiver detect signals 130A through first PHY transmitter circuit 134A to USB-C connector 120. USB circuit 112 may be configured to issue receiver detect signals 132B through second PHY transmitter circuit 134B to USB-C connector 120. USB circuit 112 may be configured to determine whether any of receiver detect signals 130A, 130B issued through PHY transmitter circuits 134A, 134B resulted in a termination in a USB-C element 104. USB circuit 112 may be configured to, based upon the determination of whether any of receiver detect signals 130 issued through PHY transmitter circuits 134 resulted in the termination in USB-C element 104, and in particular which of receiver detect signals 130A, 130B resulted in the termination in USB-C element 104, determine an orientation of a USB plug 108 connected between apparatus 100 and USB-C element 104.

Apparatus 100 and USB element 104 may be implemented in any suitable manner, such as by or in laptops, computers, USB devices, USB hosts, USB hubs, chargers, adapters, memory devices, mobile devices, Internet of Things (IOT) devices, audio-visual equipment, telecommunications equipment, networking equipment, infotainment devices, or vehicle head units. Each of apparatus 100 and USB element 104 may include therein USB components as well as other system components that rely upon or use the USB components for communication. Each of apparatus 100 and USB element 104 may include or may implement any suitable USB element, such as a USB hub, USB host, or USB device. The operation of apparatus 100 may be fully or in part determined, set, or controlled by USB circuit 112. USB circuit 112 may be implemented by analog circuitry, digital circuitry, control logic, instructions for execution by a processor (not shown), a programmable logic device, reconfigurable logic, a field programmable gate array, an application-specific integrated circuit, or any suitable combination thereof. USB circuit 112 may cause implementation of, for example, a USB host, USB device, or USB hub.

USB-C connector 120 may be implemented in any suitable manner, such as with plastic, metal, wiring, or any suitable combination thereof. USB-C connector 120 may include 24 pins. USB plug 108 may be able to be inserted into a receptacle of USB-C connector 120 in one of two orientations. These may be referred to as a flipped orientation and an unflipped orientation in the present disclosure.

USB circuit 112 may include any suitable number and kind of PHY circuits, such as PHY 118A and PHY 118B. PHYs 118A, 118B may generally be termed PHY 118. PHYs 118 may be implemented in any suitable manner, such as physical layer, electronic circuit, integrated circuit, analog circuitry, digital circuitry, or any suitable combination thereof. PHYs 118 may provide physical layer functions for interfacing USB circuit 112 and pins of USB-C connector 120. PHYs 118 may include, for example, interfaces for a set of TX+, TX−, RX+, and RX− pins such as TX1+, TX1−, RX1+, and RX1− pins for PHY 118A, or TX2+, TX2−, RX2+, and RX2− pins for PHY 118B. A transmit signal may be sent on both the paths to TX+ and TX− pins, as these together make up a differential pin pair. Similarly, a received signal may be received on paths from both the RX+ and RX− pins, as these together make up a differential pin pair.

PHYs 118 may each in turn include respective PHY transmitter circuits 134, which may be implemented in any suitable manner, such as physical layer, electronic circuit, integrated circuit, analog circuitry, digital circuitry, or any suitable combination thereof.

USB circuit 112 may be configured to detect orientation of plug 108 through operation of PHYs 118. USB circuit 112 may utilize new added states in the hardware state machine for the operation of PHYs 118. Moreover, the operation of two adjacent PHYs such as PHY 118A and PHY 118B may be linked in respective state machines of USB circuit 112. PHYs 118, by being adjacent PHYs, may form a USB 3 port.

Figure 2:
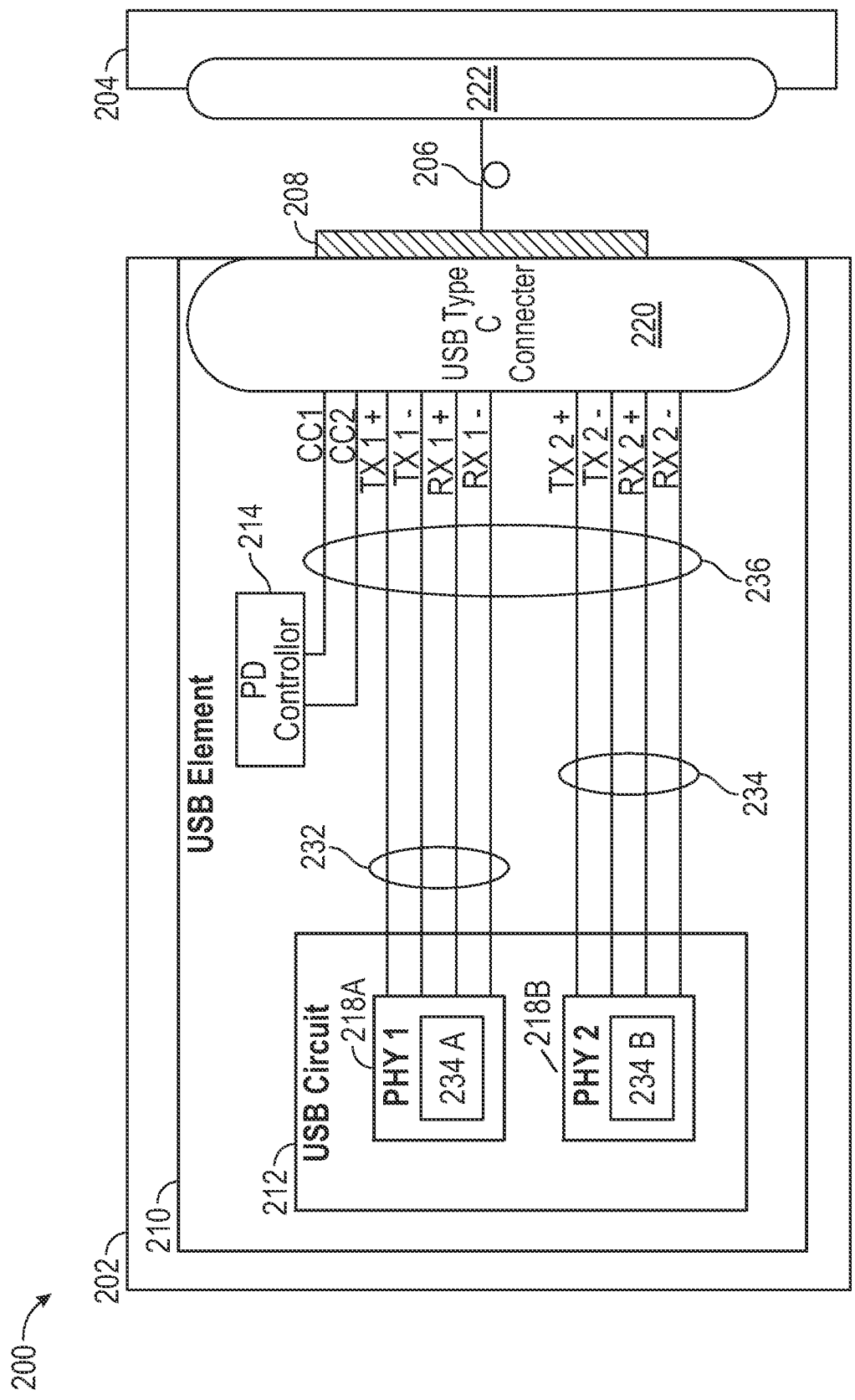
FIG. 2 is an illustration of an example system with automatic USB-C orientation detection from a USB 3 port, according to examples of the present disclosure.

FIG. 2 is an illustration of an example system 200 with automatic USB-C orientation detection from a USB 3 port, according to examples of the present disclosure. System 200 may implement, fully or in part, apparatus 100 of FIG. 1. Illustrated in system 200 are two example electronic devices 202, 204 that may be connected to each other through USB-C. For example, electronic device 202 may be connected to electronic device 204 through USB-C cable 206. Electronic devices 202, 204 may be respectively implemented in any suitable manner, such as by laptops, computers, USB devices, USB hosts, USB hosts, chargers, adapters, memory devices, mobile devices, IOT devices, audio-visual equipment, telecommunications equipment, networking equipment, infotainment devices, or vehicle head units. Each of electronic devices 202, 204 may include therein USB components as well as other system components that rely upon or use the USB components for communication. For example, electronic device 202 may include a USB element 210 and any other suitable system components that may use information sent through or received through USB element 210 during connection with electronic device 204.

USB element 210 may include or may implement any suitable USB element, such as a USB hub, USB host, or USB device. The operation of USB element 210 may be determined, set, or controlled by USB circuit 212. USB circuit 212 may be implemented by analog circuitry, digital circuitry, control logic, instructions for execution by a processor (not shown), or any suitable combination thereof. USB circuit 212 may cause implementation of, for example, a USB host, USB device, or USB hub.

USB element 210 may include a USB-C connector 220. USB-C connector 220 may be implemented in any suitable manner, such as with metal, plastic, wiring, or any suitable combination thereof. USB-C connector 220 may include 24 pins. USB-C connector 220 may be connected to a USB-C connector 222 of electronic device 204 through USB-C cable 206. USB-C cable 206 may be implemented in any suitable manner. USB-C cable 206 may include a USB plug 208. As discussed above, USB plug 208 may be able to be inserted into a receptacle of USB-C connector 220 in one of two orientations. These may be referred to as a flipped orientation and an unflipped orientation in the present disclosure.

Illustrated in FIG. 2 are a subset of the pins that may be implemented on USB-C connector 220, including CC1, CC2, TX1+, TX1−, RX1+, RX1−, TX2+, TX2−, RX2+, and RX2− pins. The combination of these pins and the paths thereto may be referred to as a USB port 236. In USB port 236, two USB channels may be available. These may be referred to as a channel A 232 and channel B 234 for the purposes of the present disclosure. Channel A 232 may include connections and pathways to TX1+, TX1−, RX1+, and RX1− pins. Channel B 234 may include connections and pathways to RX1−, TX2+, TX2−, RX2+, and RX2− pins. In one example, depending upon the detected orientation of USB plug 208, one of channel A 232 and channel B 234 may be selected for USB communication with electronic device 204. The other may be unused or repurposed for other uses.

In one example, USB circuit 212 may be configured to determine the orientation of USB plug 208. In another example, USB circuit 212 may be configured to make such a determination without input from a PD controller or PD circuit, such as PD controller 214. PD controller 214 may be implemented in any suitable manner, such as by analog circuitry, digital circuitry, instructions stored on a machine-readable medium (not shown) for execution by a processor (not shown), or any suitable combination thereof. PD controller 214 may be connected to USB-C connector 220 through CC1 and CC2 pins which, according to the USB Specification, are to be used to determine the orientation of plug 208. In contrast, USB circuit 212 may be configured to determine the orientation of plug 208 through channel A 232 and channel B 234, though the TX1+, TX1−, RX1+, RX1−, TX2+, TX2−, RX2+, and RX2− pins. USB circuit 212 might not rely upon connection with, or information from, the CC1 and CC2 pins, or information from PD controller 214, to determine the orientation of USB plug 208.

USB circuit 212 may include any suitable number and kind of PHY circuits, such as PHY 1 218A and PHY 2 218B, generally referred to as PHYs 218. PHYs 218 may be implemented in any suitable manner, such as physical layer, electronic circuit, integrated circuit, analog circuitry, digital circuitry, or any suitable combination thereof. PHYs 218 may provide physical layer functions for interfacing USB circuit 212 and pins of USB-C connector 220. PHYs 218 may include respective transmitter circuits 234, which may implement, fully or in part, transmitter circuits 134 of FIG. 1. Although denoted as "transmitter" circuits 234, transmitter circuits 234 may also include suitable circuitry to support both transmitter differential pairs (TX+/−) and receiver differential pairs (RX+/−). PHYs 218 may include, for example, interfaces for a set of TX+, TX−, RX+, and RX− pins such as TX1+, TX1−, RX1+, and RX1− pins for PHY 1 218A for channel A 232, or TX2+, TX2−, RX2+, and RX2− pins for PHY 2 218B for channel B 234. A respective transmit signal may be sent by transmitter circuits 238 on both the TX+ and TX− pins of the respective channel, as these together make up a differential pin pair. Similarly, a received signal may be received on both the RX+ and RX− pins (not shown) of the respective channel, as these together make up a differential pin pair. PHY circuits 218 may respectively provide a respective USB-C channel for data communication with a USB element of device 204. A combination of PHY circuits 218 and the paths to connector 220 may make up USB port 236. Moreover, USB port 236 may also include CC1 and CC2 pins and paths thereto from PD controller 214. Only one of channels 232, 234 may be active for a USB 3 connection on USB port 236.

USB circuit 212 may be configured to detect orientation of plug 208 through operation of PHYs 218. USB circuit 212 may utilize states in the state machine for the operation of PHYs 218. Moreover, the operation of two adjacent PHYs such as PHY1 118A and PHY 2 218B may be linked in the respective state machines. PHYs 218, by being adjacent PHYs, may form a USB 3 port. Through detection of the orientation of plug 208 through operation of PHYs 218, USB circuit 212 need not utilize CC1 and CC2 for this detection, eliminating a need for a communication path between USB circuit 212 and PD controller 214. In various examples, only the transmitter circuits, and not the receiver circuits, of PHYs 118 might need to be used to evaluate waveforms to make detections of an orientation of plug 208.

Figure 3:
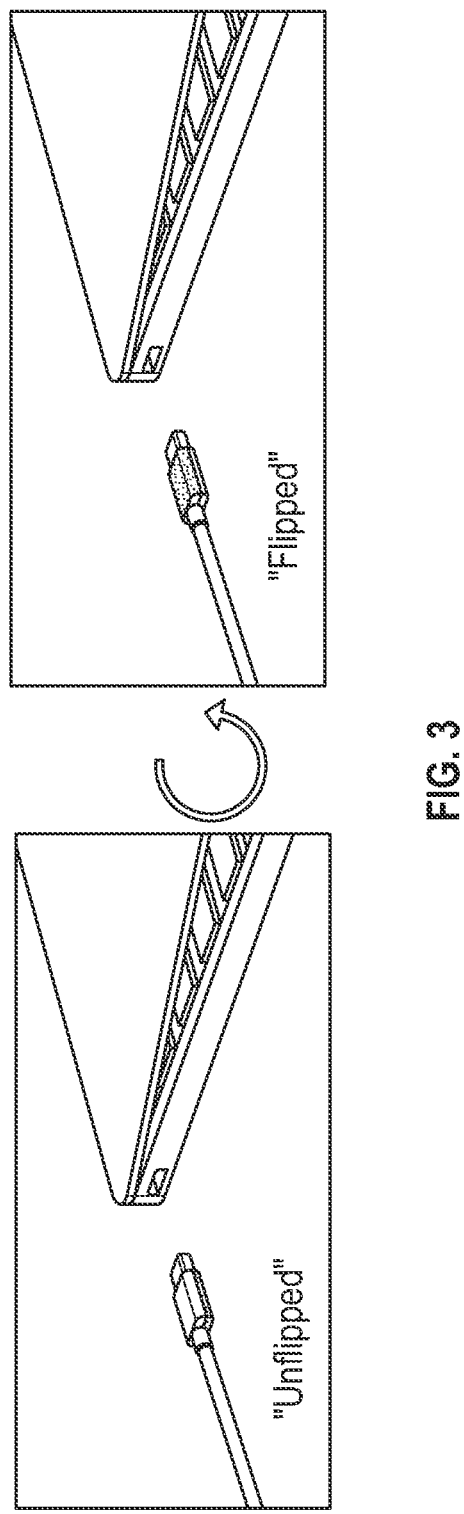
FIG. 3 is an illustration of an example USB-C plug in a flipped orientation and an unflipped orientation to be inserted into a receptacle of the example system, according to examples of the present disclosure.

FIG. 3 is an illustration of an example USB-C plug in a flipped orientation and an unflipped orientation to be inserted into a receptacle of the example system, according to examples of the present disclosure. The plug may be implemented by, for example, USB plug 208.

FIGS. 4A and 4B are illustrations of a USB 3 PHY transmitter circuit 400 to detect a connection to a USB 3 PHY receiver circuit 402, according to examples of the present disclosure. USB 3 PHY transmitter circuit 400 may be implemented, for example, by transmitter circuits 238. USB 3 PHY receiver 402 may be implemented by an instance of a PHY in electronic device 204.

PHY transmitter circuit 400 may be configured to perform a receiver detect, or RX detect, function. To perform this, the port that includes a given PHY may be enabled, such as USB port 236. The USB port may be enabled by a host driver if the port is of a USB host or if the port is of a downstream-facing port (DFP) of a USB hub. The port may be enabled by a USB command addressed to a hub control endpoint. The port may be enabled by detection of a signal on a VBUS pin (not shown) if the port is of a USB device or if the port is of an upstream-facing port (UFP) of a USB hub. The port may be enabled by USB circuit 212. The port may be enabled by a USB command addressed to a hub control endpoint, such as USB circuit 212.

Once enabled, USB port 236 may repeatedly send out receiver detect signals. These may be sent through PHYs 218 and PHY transmitter TX+ and TX− lines, such as those connected to PHYs 218. The receiver detect signals may be of a periodic nature. The receiver detect signals may be issued as, for example, square waves. USB circuit 212 may evaluate the receiver detect signals on the respective TX+ and TX− lines to see if any connections have been made between connectors 220, 222 using cable 206. The transmitted signals on the TX+ and TX− lines may be monitored by the transmitter circuit of the PHY transmitter itself, monitoring the rising signal time. The connections may be determined by identifying a far end termination on the other side of cable 206 in electronic device 204.

If no termination is detected through USB-C connector 220, cable 206, USB-C connector 222, and to a PHY (such as a USB 3 PHY receiver) of electronic device 204, then the receiver detect signals may remain a square wave. This is illustrated in FIG. 4A. However, if a termination is indeed made through USB-C connector 220, cable 206, USB-C connector 222, and to a PHY (such as a USB 3 PHY receiver) of electronic device 204, then the receiver detect signals may change. For example, the receiver detect signals on the respective TX+ and TX− lines may become skewed in their rise time, as illustrated in FIG. 4B. USB circuit 212 may be configured to monitor the status of the receiver detect signals on the respective TX+ and TX− lines issued through PHYs 218 and determined, based upon the signals, whether a termination has been made to a receiver PHY in electronic device 204. A difference between a square wave (as shown in FIG. 4A) and a skewed rise time (as shown in FIG. 4B) may be based upon any suitable threshold of rise times.

Returning to FIG. 2, in one example, in order to detect the orientation of plug 208, USB circuit 212 may be configured to alternately or simultaneously issue receiver detect signals on the PHY transmitter pin TX1+ and TX1− of PHY 1 218A, and on the PHY transmitter pins TX2+ and TX2− of PHY 2 218B. USB circuit 212 may be configured to issue receiver detect signals on the PHY transmitter pin TX1+ and TX1− of PHY 1 218A through transmitter circuit 234A of PHY 1 218A and determine whether the shape of a waveform such as the receiver detect signals indicate a termination to a USB 3 PHY receiver. Thus, USB circuit 212 may detect termination in a USB-C element of device 204 through a changed waveform of the issued received detect signals of PHY 1 218A. USB circuit 212 may then be configured to issue receiver detect signals on the PHY transmitter pin TX2+ and TX2− of PHY 2 218B through transmitter circuit 234B of PHY 2 218B and determine whether the shape of a waveform such as the receiver detect signals indicate a termination to a USB 3 PHY receiver. Thus, USB circuit 212 may detect termination in a USB-C element of device 204 through a changed waveform of the issued received detect signals of PHY 2 218B. From the results of this round of issuance of receiver detect signals, USB circuit 212 may be configured to determine the orientation of plug 208.

If no terminations are detected through either of PHY 1 218A or PHY2 218B, then no USB connection with electronic device 204 might have been detected. Thus, USB circuit 212 may determine that USB plug 208 does not provide a connection between device 202 and a USB element of device 204.

USB circuit 212 may continue polling through issuance of RX detection signals over PHYs 218 as described above.

If no terminations are detected through PHY 1 218A, but a termination is detected through PHY 2 218B, then a link partner has been detected on PHY 2 218B. A USB 3 connection may be established by USB circuit 212 through channel B 234. This termination was detected through channel B 234, while channel A 232 was not connected. This may happen, for example, when plug 208 is connected to USB-C connector 220 in a second or flipped orientation. Thus, USB circuit 212 may determine an orientation of plug 208 connected between device 202 and a USB element of device 204. Plug 208 may be in a flipped or second orientation, wherein the flipped or second orientation is to enable a USB 3 data connection between PHY transmitter circuit 234B and the USB-C element of device 204. The USB 3 data connection may be made by selectively enabling one of channels 232, 234 on port 236.

If no terminations are detected through PHY 2 218B, but a termination is detected through PHY 1 218A, then a link partner has been detected on PHY 1 218A. A USB 3 link may be established by USB circuit 212 through channel A 232. This termination was detected through channel A 232, while channel B 234 was not connected. This may happen, for example, when plug 208 is connected to USB-C connector 220 in a first or unflipped first orientation, opposite of the second orientation. Thus, USB circuit 212 may determine an orientation of plug 208 connected between device 202 and a USB element of device 204. Plug 208 may be in a unflipped or first orientation, wherein the unflipped or first orientation is to enable a USB 3 data connection between PHY transmitter circuit 234A and the USB-C element of device 204.

If terminations are detected in both PHY1 218A and PHY2 218B, then an error may have occurred, or no USB device is connected. USB circuit 212 may continue polling through issuance of RX detection signals over PHYs 218 as described above. Thus, USB circuit 212 may repeatedly issue receive detect signals alternately through PHY transmitter circuits 234 until termination in a USB-C element of device 204 is determined.

Figure 5:
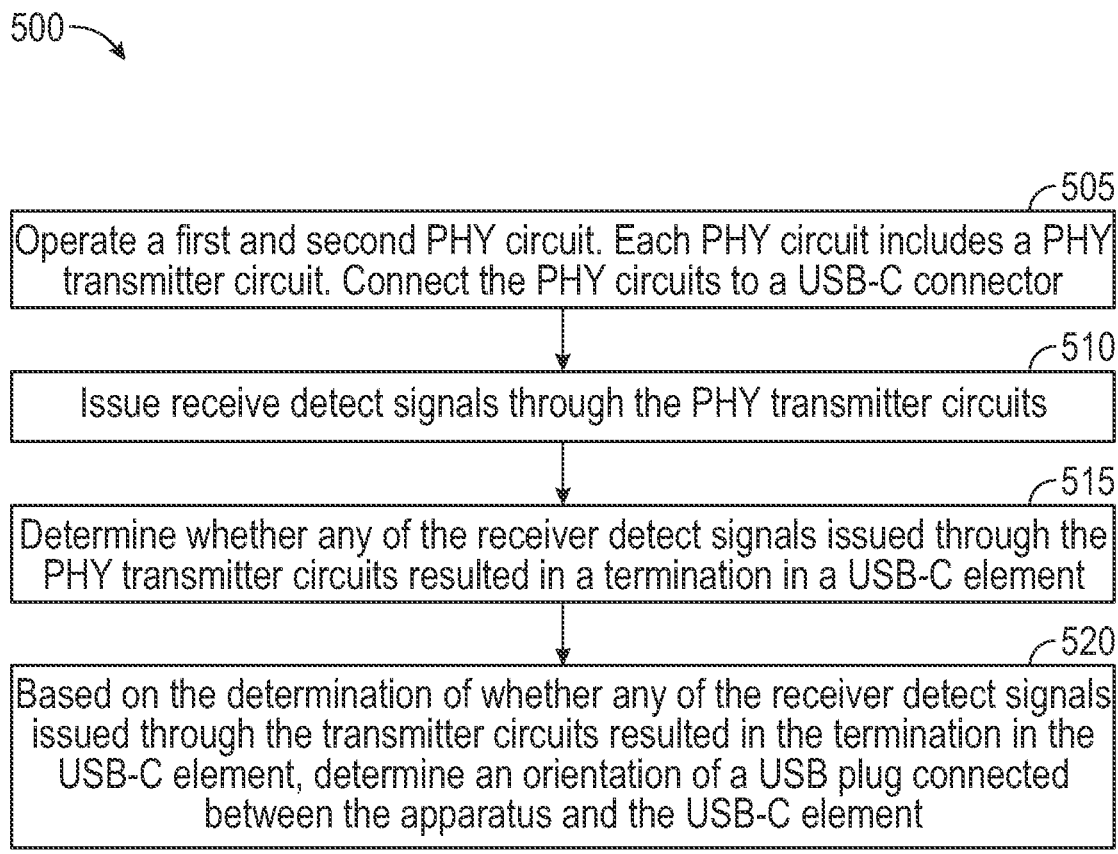
FIG. 5 is an illustration of operation of a method for automatic USB-C orientation detection from a USB 3 port, according to examples of the present disclosure.

FIG. 5 is an illustration of operation of a method 500 for automatic USB-C orientation detection from a USB 3 port, according to examples of the present disclosure.

Method 500 may be performed by any suitable mechanism, such as apparatus 100, USB circuit 112, system 200, USB circuit 212, PHY transmitter circuit 400, or any other suitable elements of FIGS. 1-4. In particular, method 500 may be performed by USB circuit 112. Method 500 may begin at any suitable block and upon any suitable criteria. Method 500 may optionally repeat. Method 500 may be performed with fewer or more blocks than shown in FIG. 5. Moreover, blocks of method 500 may be omitted, repeated, performed in parallel, performed in a different order than shown in FIG. 5, or performed recursively. One or more blocks of method 500, although shown in an order, may be performed at the same time or in a reordered manner.

At 505, a first and second PHY circuit may be operated. Each PHY circuit may include a PHY transmitter circuit. The PHY circuits may be connected to a USB-C connector. The PHY circuits may be operated by sending and receiving detect or other USB signals.

At 510, receive detect signals may be issued through the PHY transmitter circuits. The signals may be sent alternately or simultaneously through the PHY transmitter circuits.

At 515, it may be determined whether any of the receiver detect signals issued through the PHY transmitter circuits resulted in a termination in a USB-C element.

At 520, based on the determination of whether any of the receiver detect signals issued through the transmitter circuits resulted in the termination in the USB-C element, determine an orientation of a USB plug connected between the apparatus and the USB-C element.

Figure 6:
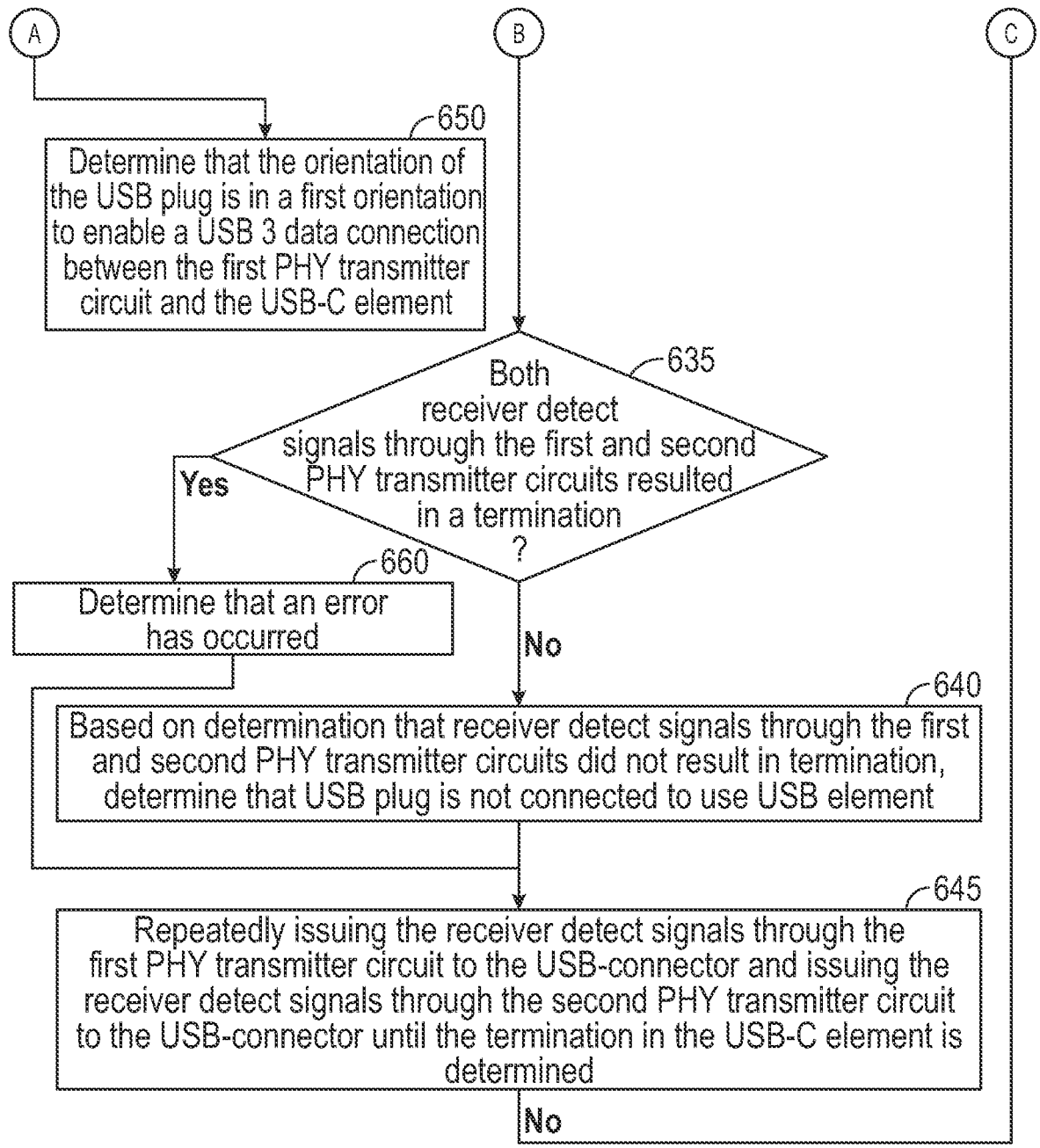
FIG. 6 is an illustration of operation of a more detailed method for automatic USB-C orientation detection from a USB 3 port, according to examples of the present disclosure.

FIG. 6 is an illustration of operation of a more detailed method 600 for automatic USB-C orientation detection from a USB 3 port, according to examples of the present disclosure. Method 600 may implement, fully or in part, method 500 of FIG. 5.

Method 600 may be performed by any suitable mechanism, such as apparatus 100, USB circuit 112, system 200, USB circuit 212, PHY transmitter circuit 400, or any other suitable elements of FIGS. 1-4. In particular, method 600 may be performed by USB circuit 212. Method 600 may begin at any suitable block and upon any suitable criteria. Method 600 may optionally repeat. Method 600 may be performed with fewer or more blocks than shown in FIG. 6. Moreover, blocks of method 600 may be omitted, repeated, performed in parallel, performed in a different order than shown in FIG. 6, or performed recursively. One or more blocks of method 600, although shown in an order, may be performed at the same time or in a reordered manner.

At 605, a first and second PHY circuit may be operated. Each PHY circuit may include a PHY transmitter circuit. The PHY circuits may be connected to a USB-C connector. Each PHY transmitter circuit may be capable of providing a USB-C channel for data communication with a USB-C element. A USB-3 port for data communication with the USB-C element may be established by a combination of the PHY circuits, wherein one of the PHY circuits is used for a given orientation.

At 610, receive detect signals may be issued through the PHY transmitter circuits.

At 615, it may be determined whether any of the receiver detect signals issued through the PHY transmitter circuits resulted in a termination in a USB-C element. A termination in the USB-C element is detected by a changed waveform of the receiver detect signals.

At 620, based on the determination of whether any of the receiver detect signals issued through the transmitter circuits resulted in the termination in the USB-C element, an orientation of a USB plug connected between the apparatus and the USB-C element may be determined. Step 620 may be implemented by, for example, steps 625-660.

At 625, it may be determined whether receiver detect signal through the first PHY transmitter circuit resulted in a termination, and that receiver detect signal through the second PHY transmitter circuit did not result in a termination. If so, method 600 may proceed to 650. Otherwise, method 600 may proceed to 630.

At 630, it may be determined whether receiver detect signal through the second PHY transmitter circuit resulted in a termination, and receiver detect signal through the first PHY transmitter circuit did not result in a termination. If so, method 600 may proceed to 655. Otherwise, method 600 may proceed to 635.

At 635, it may be determined whether both receive detect signals through the PHY transmitter circuits resulted in a termination. If so, method 600 may proceed to 660, otherwise, method 600 may proceed to 640.

At 640, based on determination that receiver detect signals through the first and second PHY transmitter circuits did not result in termination, it may be determined that the USB plug is not connected to USB element. Method 600 may proceed to 645.

At 645, the receiver detect signals may be repeatedly issued through the first PHY transmitter circuit to the USB-connector and through the second PHY transmitter circuit to the USB-connector until the termination in the USB-C element is determined. This may be performed by, for example, returning to 610.

At 650, it may be determined that the orientation of the USB plug is in a first orientation to enable a USB 3 data connection between the first PHY transmitter circuit and the USB-C element.

At 655, it may be determined that the orientation of the USB plug is in a second orientation to enable a USB 3 data connection between the second PHY transmitter circuit and the USB-C element.

At 660, it may be determined that an error has occurred. The error may be communicated in any suitable manner, such as by setting a message in a status register indicating the error and optionally generating an alert. In another example, the error may be communicated by asserting a device pin state while the error condition is present. In such an example, a LED indicator may be driven to communicate the error condition. Method 600 may proceed to 645.

Figure 7:
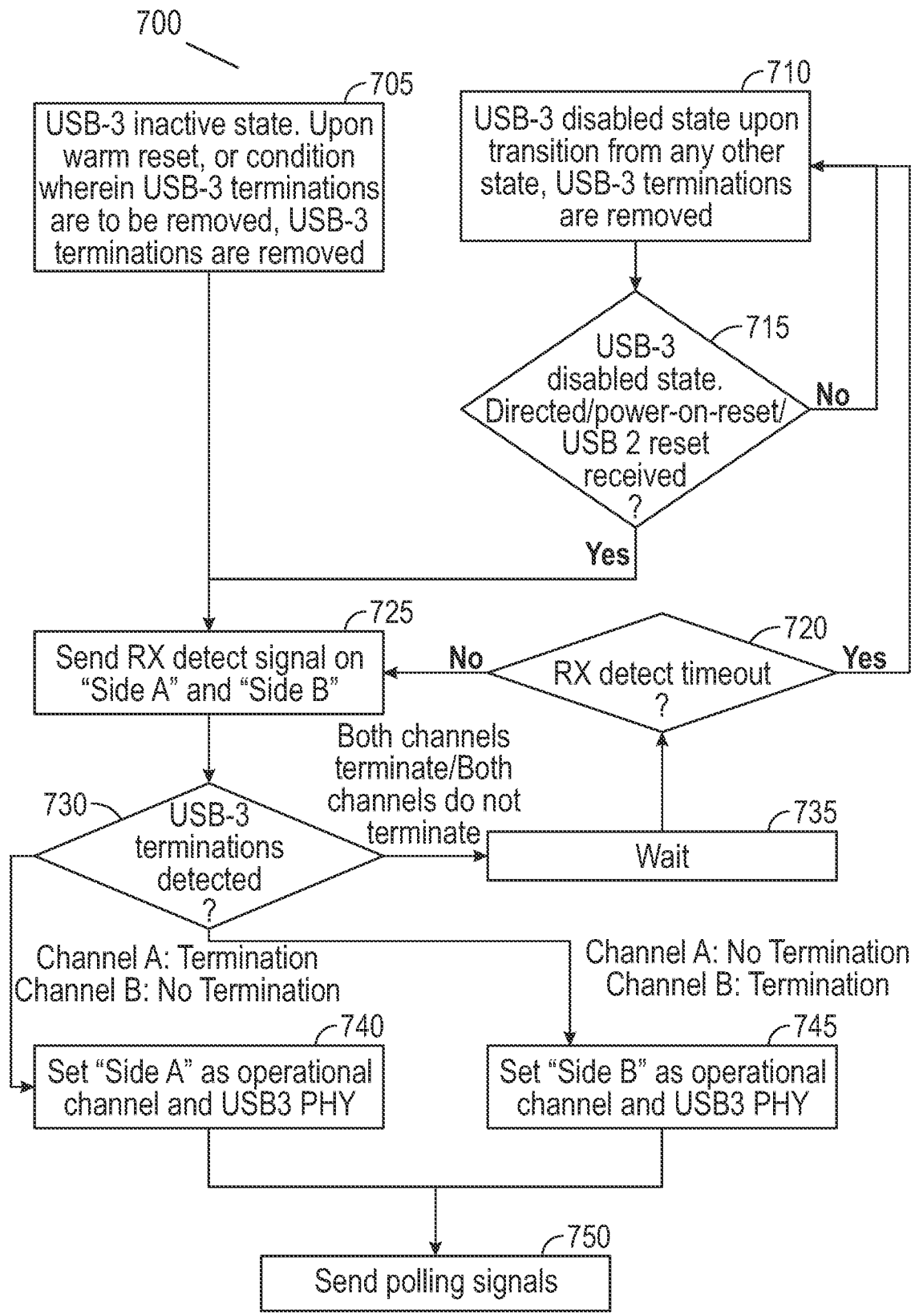
FIG. 7 is an illustration of operation of a more detailed method for automatic USB-C orientation detection from a USB 3 port, according to examples of the present disclosure.

FIG. 7 is an illustration of operation of a more detailed method 700 for automatic USB-C orientation detection from a USB 3 port, according to examples of the present disclosure. Method 700 may implement, fully or in part, methods 500, 600.

Method 700 may be performed by any suitable mechanism, such as apparatus 100, USB circuit 112, system 200, USB circuit 212, PHY transmitter circuit 400, or any other suitable elements of FIGS. 1-4. In particular, method 700 may be performed by USB circuit 212. Method 700 may begin at any suitable block and upon any suitable criteria. Method 700 may optionally repeat. Method 700 may be performed with fewer or more blocks than shown in FIG. 7. Moreover, blocks of method 700 may be omitted, repeated, performed in parallel, performed in a different order than shown in FIG. 7, or performed recursively. One or more blocks of method 600, although shown in an order, may be performed at the same time or in a reordered manner.

Method 700 may illustrate a state machine of port 236.

Method 700 may begin in a USB-3 inactive state in 705 or in a USB-3 disabled state in 710.

At 705, upon warm reset, or condition wherein USB-3 terminations are to be removed, USB-3 terminations may be removed. USB 3 port 236 may be enabled. Method 700 may proceed to 725 and an RX detect state.

At 710, upon a transition from any other state in the state machine, USB-3 terminations may be removed, and method 700 may proceed to 715, USB-3 disabled state.

At 715, it may be detected whether a directed signal, a power-on-reset signal, or a USB 2 bus reset was received. A directed signal may include a command from a higher level of a USB host or device stack. If no such directed, power-on-reset, or USB 2 reset signal was received, method 700 may return to 710. If so, method 700 may move into the RX detect state in 720 or to 725.

At 720, it may be determined whether there was an RX timeout. The RX timeout may facilitate a USB element to stop attempting to connect at USB-3 speeds and instead switch to USB-2 speeds after a timeout period of, for example, 1 second. Such an RX timeout may indicate a problem with a USB-3 connection and rather than persisting in the connection, slower USB-2 speeds may be attempted. If so, method 700 may return to 710. If not, method 700 may proceed to 725.

At 725, USB circuit 212 may send an RX detect signal through channel A 232 and the TX+, TX− connections therein of PHY 1 218A, and an RX detect signal through channel B 234 and the TX+, TX− connections therein of PHY 2 218B. Method 700 may proceed to 730.

At 730, USB circuit 212 may determine the results of sending the RX detect signals. If RX detect signals sent on channel A resulted in a termination but channel B did not result in a termination, USB circuit 112 may proceed to 740 and set channel A and PHY 1 218A as the operational PHY and determine that plug 208 is in a first orientation, such as unflipped. If RX detect signals sent on channel B resulted in a termination but channel A did not result in a termination, USB circuit 212 may proceed to 745 and set channel B and PHY 2 218B as the operational PHY and determine that plug 208 is in a second orientation, such as flipped. If RX detect signals sent on both channel A and channel B resulted in a termination, or if RX detect signals sent on neither of channel resulted in a termination, USB circuit 112 may proceed to 735 and wait for a defined period of time, such as 500 milliseconds. Method 700 may then proceed to 720.

After performance of 740 or 745, wherein one of PHYs 218 and channels A or B have been selected, at 750, further USB 3 configuration operations may be performed, such as sending a polling LFPS signal.

Examples of the present disclosure may include an apparatus. The apparatus may include a first PHY circuit including a first PHY transmitter circuit, the first PHY circuit to connect to a universal serial bus (USB)-C connector, a second PHY circuit including a second PHY transmitter circuit, the second PHY circuit to connect to the USB-C connector, and a USB circuit. The PHY circuits and USB circuit may be implemented by analog circuitry, digital circuitry, control logic, instructions for execution by a processor (not shown), a programmable logic device, reconfigurable logic, a field programmable gate array, an application-specific integrated circuit, or any suitable combination thereof. The USB circuit may be configured to issue a first receiver detect signal through the first PHY transmitter circuit to the USB-C connector, issue a second receiver detect signal through the second PHY transmitter circuit to the USB-C connector, determine whether the first receiver detect signal or the second receiver detect signal resulted in a termination in a USB-C element, and, based upon the determination of whether the first receiver detect signal or the second receiver detect signal resulted in the termination in the USB-C element, determine an orientation of a USB plug connected between the apparatus and the USB-C element.

In combination with any of the above examples, the determination of the orientation of the USB plug connected between the apparatus and the USB-C element may include a determination that the first receiver detect signal through the first PHY transmitter circuit to the USB-C connector resulted in the termination in the USB-C element, a determination that the second receiver detect signal through the second PHY transmitter circuit to the USB-C connector did not result in the termination in the USB-C element, and, based upon a determination that the first receiver detect signal through the first PHY transmitter circuit to the USB-C connector resulted in the termination in the USB-C element and that the second receiver detect signal through the second PHY transmitter circuit to the USB-C connector did not result in the termination in the USB-C element, a determination that the orientation of the USB plug is in a first orientation to enable a USB 3 data connection between the first PHY transmitter circuit and the USB-C element.

In combination with any of the above examples, determination of the orientation of the USB plug connected between the apparatus and the USB-C element may include a determination that the first receiver detect signal through the first PHY transmitter circuit to the USB-C connector did not result in the termination in the USB-C element, a determination that the second receiver detect signal through the second PHY transmitter circuit to the USB-C connector resulted in the termination in the USB-C element, and, based upon a determination that the first receiver detect signal through the first PHY transmitter circuit to the USB-C connector did not result in the termination in the USB-C element and that the second receiver detect signal through the second PHY transmitter circuit to the USB-C connector resulted in the termination in the USB-C element, a determination that the orientation of the USB plug is in a second orientation to enable a USB 3 data connection between the second PHY transmitter circuit and the USB-C element.

In combination with any of the above examples, the USB circuit may be configured to determine that the first receiver detect signal through the first PHY transmitter circuit to the USB-C connector did not result in the termination in the USB-C element, determine that the second receiver detect signal through the second PHY transmitter circuit to the USB-C connector did not result in the termination in the USB-C element, and, based upon a determination that the first receiver detect signal through the first PHY transmitter circuit to the USB-C connector did not result in the termination in the USB-C element and that the second receiver detect signal through the second PHY transmitter circuit to the USB-C connector did not result in the termination in the USB-C element, determine that the USB plug is not connected between the apparatus and the USB-C element.

In combination with any of the above examples, the first PHY circuit and the second PHY circuit may be configured to respectively provide a USB-C channel for data communication with the USB-C element.

In combination with any of the above examples, a combination of the first PHY circuit and the second PHY circuit may be configured to provide a USB 3 port for data communication with the USB-C element, wherein one the PHY circuits is used for a given orientation.

In combination with any of the above examples, the USB circuit may be configured to repeatedly issue the receiver detect signals through the first PHY transmitter circuit to the USB-connector and through the second PHY transmitter circuit to the USB-connector until the termination in the USB-C element is determined.

In combination with any of the above examples, the USB circuit may be configured to detect the termination in the USB-C element by a changed waveform of the receiver detect signals.

In combination with any of the above examples, the USB circuit may be configured to detect that the first receiver detect signal resulted in the termination in the USB-C element wherein the first receiver detect signal was a square wave issued on the first PHY transmitter circuit and the USB circuit is to observe that the square wave resulted in a non-square wave with a skewed rise time on a connection to the first transmitter circuit.

In combination with any of the above examples, the USB circuit may be configured to detect that the second receiver detect signal did not result in the termination in the USB-C element wherein the second receiver detect signal was a square wave issued on the second PHY transmitter circuit and the USB circuit is to observe that the square wave was unchanged on a connection to the first transmitter circuit.

Examples of the present disclosure may include a method. The method may include operating a first PHY circuit, the first PHY circuit including a first PHY transmitter circuit, the first PHY circuit to connect to a universal serial bus (USB)-C connector, operating a second PHY circuit, the second PHY circuit including a second PHY transmitter circuit, the first PHY circuit to connect to the USB-C connector, issuing first receiver detect signals through the first PHY transmitter circuit to the USB-C connector, issuing second receiver detect signals through the second PHY transmitter circuit to the USB-C connector, determining whether the first receiver detect signals or the second receiver detect signals resulted in a termination in a USB-C element, and, based upon the determination of whether the first receiver detect signals or the second receiver detect signals resulted in the termination in the USB-C element, determining an orientation of a USB plug connected between the apparatus and the USB-C element.

In combination with any of the above examples, determining the orientation of the USB plug connected between the apparatus and the USB-C element may include determining that the first receiver detect signal resulted in the termination in the USB-C element, determining that the second receiver detect signal did not result in the termination in the USB-C element, and, based upon the determination that the first receiver detect signal resulted in the termination in the USB-C element and that the second receiver detect signal did not result in the termination in the USB-C element, determining that the orientation of the USB plug is in a first orientation to enable a USB 3 data connection between the first PHY transmitter circuit and the USB-C element.

In combination with any of the above examples, determining the orientation of the USB plug connected between the apparatus and the USB-C element may include determining that the first receiver detect signal did not result in the termination in the USB-C element, determining that the second receiver detect signal resulted in the termination in the USB-C element, and, based upon the determination that the first receiver detect signal did not result in the termination in the USB-C element and that the second receiver detect signal resulted in the termination in the USB-C element, determining that the orientation of the USB plug is in a second orientation to enable a USB 3 data connection between the second PHY transmitter circuit and the USB-C element.

In combination with any of the above examples, the method may include determining that the first receiver detect signal did not result in the termination in the USB-C element, determining that the second receiver detect signal did not result in the termination in the USB-C element, and, based upon the determination that the first receiver detect signal did not result in the termination in the USB-C element and that the second receiver detect signal did not result in the termination in the USB-C element, determining that the USB plug is not connected between the apparatus and the USB-C element.

In combination with any of the above examples, the method may include providing a USB-C channel for data communication with the USB-C element with the first PHY circuit and the second PHY circuit.

In combination with any of the above examples, the method may include providing a USB 3 port for data communication with the USB-C element with a combination of the first PHY circuit and the second PHY circuit, wherein one the PHY circuits is used for a given orientation.

In combination with any of the above examples, the method may include comprising repeatedly issuing the first receiver detect signals through the first PHY transmitter circuit to the USB-connector and the second receiver detect signals through the second PHY transmitter circuit to the USB-connector until the termination in the USB-C element is determined.

In combination with any of the above examples, the method may include detecting the termination in the USB-C element by a changed waveform of the receiver detect signals.

In combination with any of the above examples, the method may include detecting that the first receiver detect signal resulted in the termination in the USB-C element, including issuing the first receiver detect signal a square wave on the first PHY transmitter circuit, and observing that the square wave resulted in a non-square wave with a skewed rise time on a connection to the first transmitter circuit.

In combination with any of the above examples, the method may include detecting that the second receiver detect signal did not result in the termination in the USB-C element, including, issuing the second receiver detect signal a square wave on the second PHY transmitter circuit, and observing that the square wave was unchanged on a connection to the first transmitter circuit.

Although examples have been described above, other variations and examples may be made from this disclosure without departing from the spirit and scope of these examples.

I claim:

1. An apparatus, comprising:
    a first PHY circuit including a first PHY transmitter circuit, the first PHY circuit to connect to a universal serial bus (USB)-C connector;
    a second PHY circuit including a second PHY transmitter circuit, the second PHY circuit to connect to the USB-C connector; and
    a USB circuit to:
        issue a first receiver detect signal through the first PHY transmitter circuit to the USB-C connector;
        determine whether issuance of the first receiver detect signal resulted in a first changed waveform from the first receiver detect signal to determine whether the first receiver detect signal resulted in a termination in a USB-C element;
        issue a second receiver detect signal through the second PHY transmitter circuit to the USB-C connector;
        determine whether issuance of the second receiver detect signal resulted in a second changed waveform from the second receiver detect signal to determine whether the second receiver detect signal resulted in a termination in the USB-C element;
        determine whether the first receiver detect signal or the second receiver detect signal resulted in a termination in the USB-C element; and
        based upon the determination of whether the first receiver detect signal or the second receiver detect signal resulted in the termination in the USB-C element, determine an orientation of a USB plug connected between the apparatus and the USB-C element;
    wherein the USB circuit is to repeatedly, until the termination in the USB-C element is determined:
        issue the receiver detect signals through the first PHY transmitter circuit to the USB-connector to determine whether the first receiver detect signal resulted in a termination in a USB-C element;
        alternately or simultaneously issue the receiver detect signals through the second PHY transmitter circuit to the USB-connector to determine whether the first receiver detect signal resulted in a termination in a USB-C element; and
        when the termination in the USB-C element is determined, cease issuance of the receiver detect signals through the first and second PHY transmitter circuits to the USB-connector.

2. The apparatus of claim 1, wherein the determination of the orientation of the USB plug connected between the apparatus and the USB-C element comprises:
    determine that the first receiver detect signal through the first PHY transmitter circuit to the USB-C connector resulted in the termination in the USB-C element;
    determine that the second receiver detect signal through the second PHY transmitter circuit to the USB-C connector did not result in the termination in the USB-C element;
    based upon a determination that the first receiver detect signal through the first PHY transmitter circuit to the USB-C connector resulted in the termination in the USB-C element and that the second receiver detect signal through the second PHY transmitter circuit to the USB-C connector did not result in the termination in the USB-C element, determine that the orientation of the USB plug is in a first orientation to enable a USB 3 data connection between the first PHY transmitter circuit and the USB-C element.

3. The apparatus of claim 1, wherein the determination of the orientation of the USB plug connected between the apparatus and the USB-C element comprises:
    determine that the first receiver detect signal through the first PHY transmitter circuit to the USB-C connector did not result in the termination in the USB-C element;
    determine that the second receiver detect signal through the second PHY transmitter circuit to the USB-C connector resulted in the termination in the USB-C element;
    based upon a determination that the first receiver detect signal through the first PHY transmitter circuit to the USB-C connector did not result in the termination in the USB-C element and that the second receiver detect signal through the second PHY transmitter circuit to the USB-C connector resulted in the termination in the USB-C element, determine that the orientation of the USB plug is in a second orientation to enable a USB 3 data connection between the second PHY transmitter circuit and the USB-C element.

4. The apparatus of claim 1, wherein the USB circuit is to:
determine that the first receiver detect signal through the first PHY transmitter circuit to the USB-C connector did not result in the termination in the USB-C element;
determine that the second receiver detect signal through the second PHY transmitter circuit to the USB-C connector did not result in the termination in the USB-C element;
based upon a determination that the first receiver detect signal through the first PHY transmitter circuit to the USB-C connector did not result in the termination in the USB-C element and that the second receiver detect signal through the second PHY transmitter circuit to the USB-C connector did not result in the termination in the USB-C element, determine that the USB plug is not connected between the apparatus and the USB-C element.

5. The apparatus of claim 1, wherein the first PHY circuit and the second PHY circuit are to respectively provide a USB-C channel for data communication with the USB-C element.

6. The apparatus of claim 1, wherein a combination of the first PHY circuit and the second PHY circuit is to provide a USB 3 port for data communication with the USB-C element, wherein one of the PHY circuits is used for a given orientation.

7. The apparatus of claim 1, wherein the USB circuit is to detect the termination in the USB-C element by a changed waveform of the receiver detect signals.

8. The apparatus of claim 1, wherein the USB circuit is to detect that the first receiver detect signal resulted in the termination in the USB-C element wherein the first receiver detect signal was a square wave issued on the first PHY transmitter circuit and the USB circuit is to observe that the square wave resulted in a non-square wave with a skewed rise time on a connection to the first transmitter circuit.

9. The apparatus of claim 1, wherein the USB circuit is to detect that the second receiver detect signal did not result in the termination in the USB-C element wherein the second receiver detect signal was a square wave issued on the second PHY transmitter circuit and the USB circuit is to observe that the square wave was unchanged on a connection to the first transmitter circuit.

10. A method, comprising:
operating a first PHY circuit, the first PHY circuit including a first PHY transmitter circuit, the first PHY circuit to connect to a universal serial bus (USB)-C connector;
operating a second PHY circuit, the second PHY circuit including a second PHY transmitter circuit, the first PHY circuit to connect to the USB-C connector;
issuing first receiver detect signals through the first PHY transmitter circuit to the USB-C connector;
issuing second receiver detect signals through the second PHY transmitter circuit to the USB-C connector;
with the USB circuit, determining whether issuance of the first receiver detect signal resulted in a first changed waveform from the first receiver detect signal to determine whether the first receiver detect signal resulted in a termination in a USB-C element;
with the USB circuit, determining whether issuance of the second receiver detect signal resulted in a second changed waveform from the second receiver detect signal to determine whether the second receiver detect signal resulted in a termination in the USB-C element;
with the USB circuit, based upon the determination of whether the first receiver detect signals or the second receiver detect signals resulted in the termination in the USB-C element, determining an orientation of a USB plug connected between the apparatus and the USB-C element;
with the USB circuit, until the termination in the USB-C element is determined, repeatedly:
issuing the receiver detect signals through the first PHY transmitter circuit to the USB-connector to determine whether the first receiver detect signal resulted in a termination in a USB-C element;
alternately or simultaneously issue the receiver detect signals through the second PHY transmitter circuit to the USB-connector to determine whether the first receiver detect signal resulted in a termination in a USB-C element; and
when the termination in the USB-C element is determined, ceasing issuance of the receiver detect signals through the first and second PHY transmitter circuits to the USB-connector.

11. The method of claim 10, wherein determining the orientation of the USB plug connected between the apparatus and the USB-C element comprises:
determining that the first receiver detect signal resulted in the termination in the USB-C element;
determining that the second receiver detect signal did not result in the termination in the USB-C element;
based upon the determination that the first receiver detect signal resulted in the termination in the USB-C element and that the second receiver detect signal did not result in the termination in the USB-C element, determining that the orientation of the USB plug is in a first orientation to enable a USB 3 data connection between the first PHY transmitter circuit and the USB-C element.

12. The method of claim 10, wherein determining the orientation of the USB plug connected between the apparatus and the USB-C element comprises:
determining that the first receiver detect signal did not result in the termination in the USB-C element;
determining that the second receiver detect signal resulted in the termination in the USB-C element;
based upon the determination that the first receiver detect signal did not result in the termination in the USB-C element and that the second receiver detect signal resulted in the termination in the USB-C element, determining that the orientation of the USB plug is in a second orientation to enable a USB 3 data connection between the second PHY transmitter circuit and the USB-C element.

13. The method of claim 10, comprising:
determining that the first receiver detect signal did not result in the termination in the USB-C element;
determining that the second receiver detect signal did not result in the termination in the USB-C element;
based upon the determination that the first receiver detect signal did not result in the termination in the USB-C element and that the second receiver detect signal did not result in the termination in the USB-C element, determining that the USB plug is not connected between the apparatus and the USB-C element.

14. The method of claim 10, comprising providing a USB-C channel for data communication with the USB-C element with the first PHY circuit and the second PHY circuit.

15. The method of claim 10, comprising providing a USB 3 port for data communication with the USB-C element with a combination of the first PHY circuit and the second PHY circuit, wherein one of the PHY circuits is used for a given orientation.

16. The method of claim 10, comprising detecting the termination in the USB-C element by a changed waveform of the receiver detect signals.

17. The method of claim 10, comprising detecting that the first receiver detect signal resulted in the termination in the USB-C element, including:
- issuing the first receiver detect signal a square wave on the first PHY transmitter circuit; and
- observing that the square wave resulted in a non-square wave with a skewed rise time on a connection to the first transmitter circuit.

18. The method of claim 10, comprising detecting that the second receiver detect signal did not result in the termination in the USB-C element, including:
- issuing the second receiver detect signal a square wave on the second PHY transmitter circuit; and
- observing that the square wave was unchanged on a connection to the first transmitter circuit.

\* \* \* \* \*